United States Patent
Abdulla et al.

(10) Patent No.: US 11,030,233 B2
(45) Date of Patent: Jun. 8, 2021

(54) AUTO-CITING REFERENCES TO OTHER PARTS OF PRESENTATION MATERIALS

(71) Applicant: International Business Machines Corporation, Armonk, NY (US)

(72) Inventors: Rizwan Sheikh Abdulla, Bangalore (IN); Konda Reddy Dumpa, Kadapa (IN); Seema Nagar, Bangalore (IN); Kuntal Dey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 16/250,535

(22) Filed: Jan. 17, 2019

(65) Prior Publication Data
US 2020/0233890 A1 Jul. 23, 2020

(51) Int. Cl.
| | |
|---|---|
| *G06F 16/38* | (2019.01) |
| *G06F 3/16* | (2006.01) |
| *G10L 25/54* | (2013.01) |
| *G06F 16/34* | (2019.01) |
| *G06F 16/438* | (2019.01) |
| *G06F 16/248* | (2019.01) |

(52) U.S. Cl.
CPC ............ *G06F 16/382* (2019.01); *G06F 3/167* (2013.01); *G06F 16/248* (2019.01); *G06F 16/34* (2019.01); *G06F 16/438* (2019.01); *G10L 25/54* (2013.01)

(58) Field of Classification Search
CPC ........ G06F 16/382; G06F 16/34; G06F 3/167; G10L 25/54
See application file for complete search history.

(56) References Cited

U.S. PATENT DOCUMENTS

| | | | |
|---|---|---|---|
| 9,275,254 B2 | 3/2016 | Martin | |
| 9,703,785 B2 | 7/2017 | Gambhir et al. | |
| 2007/0106499 A1* | 5/2007 | Dahlgren | G06F 16/243 704/10 |
| 2010/0174773 A1* | 7/2010 | Penner | H04L 67/06 709/203 |
| 2011/0107221 A1* | 5/2011 | Kenna | G06Q 30/0601 715/730 |
| 2011/0261030 A1* | 10/2011 | Bullock | G06F 3/04842 345/204 |
| 2012/0242695 A1* | 9/2012 | Martin | G06F 21/42 345/633 |

(Continued)

*Primary Examiner* — Ryan Barrett
(74) *Attorney, Agent, or Firm* — Patterson + Sheridan, LLP (57) ABSTRACT

The present disclosure provides for augmenting a presentation document to auto-cite references to material present in non-displayed parts of the presentation document identified via natural language processing (NLP) via displaying, in a graphical user interface (GUI), a given zone of a plurality of zones included in a presentation document; identifying, in an utterance received while the given zone is displayed in the GUI, a given key concept; identifying, via a content association map associated with the presentation document that identifies key concepts recited in the presentation document and which zones of the plurality of zones the key concepts appear in, a different zone of the plurality of zones that is not currently displayed in the GUI but in which the given key concept appears; and displaying, in the GUI concurrently with display of the given zone, a visual indicator related to the different zone.

20 Claims, 10 Drawing Sheets

(56) References Cited

U.S. PATENT DOCUMENTS

| | | | |
|---|---|---|---|
| 2012/0311438 A1* | 12/2012 | Cranfill | G06F 3/0483 |
| | | | 715/256 |
| 2013/0132852 A1 | 5/2013 | Sommer | |
| 2013/0239000 A1* | 9/2013 | Parkinson | G06F 3/017 |
| | | | 715/728 |
| 2014/0337355 A1* | 11/2014 | Heinze | G06F 16/313 |
| | | | 707/742 |
| 2015/0143234 A1* | 5/2015 | Norris, III | G06F 40/166 |
| | | | 715/256 |
| 2015/0318018 A1* | 11/2015 | Kaiser | G11B 27/102 |
| | | | 386/241 |
| 2016/0180438 A1* | 6/2016 | Boston | G06Q 30/0282 |
| | | | 705/26.7 |
| 2017/0147154 A1 | 5/2017 | Steiner et al. | |
| 2017/0242552 A1* | 8/2017 | Kirov | H04B 1/385 |
| 2018/0032219 A1* | 2/2018 | Kirov | H04B 1/385 |
| 2018/0210869 A1* | 7/2018 | Viol | G06F 16/90335 |
| 2019/0311714 A1* | 10/2019 | Barbello | G10L 15/22 |

* cited by examiner

AUTO-CITING REFERENCES TO OTHER PARTS OF PRESENTATION MATERIALS

BACKGROUND

The present invention relates to Natural Language Processing (NLP), and more specifically, to identifying material in a presentation document related to spoken utterances via NLP.

A presenter may often accompany an oral presentation with presentation document, such as, for example, a slide deck, a word processing document, or the like. These presentation documents provide textual and graphical material, which are displayed to an audience during the course of the presentation via a display device (e.g., a projector, conference room monitor, audience member device). The presenter may reference various content on a displayed portion of the presentation document (e.g., reading aloud the bullet points on a displayed slide), but the presenter or an audience member (via a spoken question) may also reference material included in the presentation document, but not currently displayed.

SUMMARY

According to one embodiment of the present invention, a method for auto-citing references to other parts of presentation materials is provided, the method comprising: displaying, in a graphical user interface (GUI), a given zone of a plurality of zones included in a presentation document; identifying, in an utterance received while the given zone is displayed in the GUI, a given key concept; identifying, via a content association map associated with the presentation document that identifies key concepts recited in the presentation document and which zones of the plurality of zones the key concepts appear in, a different zone of the plurality of zones that is not currently displayed in the GUI but in which the given key concept appears; and displaying, in the GUI concurrently with display of the given zone, a visual indicator related to the different zone.

According to one embodiment of the present invention, a system for auto-citing references to other parts of presentation materials is provided, the system comprising: a processor; and a memory storage device, including instructions that when executed by the processor enable the processor to perform an operation, the operation comprising: displaying, in a graphical user interface (GUI), a first zone of a plurality of zones included in a presentation document, wherein two or more other zones of the plurality of zones are not displayed concurrently in the GUI with the first zone; identifying, in an utterance received while the first zone is displayed in the GUI, a given key concept; identifying, via a content association map associated with the presentation document that identifies key concepts recited in the presentation document and which zones of the plurality of zones the key concepts appear in, a second zone of the plurality of zones that is not displayed but in which the given key concept appears; and displaying, in the GUI concurrently with display of the first zone, a visual indicator related to the second zone.

According to one embodiment of the present invention, a computer-readable storage medium having computer-readable program code embodied therewith for auto-citing references to other parts of presentation materials is provided, the computer-readable program code executable by one or more computer processors to: display, in a graphical user interface (GUI), a first zone of a plurality of zones included in a presentation document, wherein other zones of the plurality of zones are not displayed concurrently in the GUI with the first zone; identify, in an utterance received while the first zone is displayed in the GUI, a given key concept; identify, via a content association map associated with the presentation document that identifies key concepts recited in the presentation document and which zones of the plurality of zones the key concepts appear in, a second zone of the plurality of zones in which the given key concept appears; and display, in the GUI concurrently with display of the first zone, a visual indicator related to the second zone.

DETAILED DESCRIPTION

The present disclosure provides systems and methods for augmenting presentation material dynamically within a presentation session as a presentation happens, using natural language processing (NLP) techniques that are augmented by speech recognition techniques. The material being covered in the presentation document is analyzed and summarized using NLP techniques, and each portion of the summary is associated with one or more segments of the presentation document, creating a content association map. In a given presentation session, as a presenter presents the material supported by the presentation document, the current position of the presentation document on the display (e.g., a particular slide of a deck of slides) is treated as a current position. A speech recognition technique is conducted within the session, to note the portions of the material at the current position that are emphasized (or, covered for a longer time duration) by the presenter, and a speech recognition score is associated for each content segment so that as a presenter presents a concept is matched (via NLP techniques and affinity scoring) with the content in other, non-displayed portions of the presentation document.

In various embodiments, an affinity score is computed to identify matching content, as a factor of (a) NLP match score of the content summary with the concept at the current position, and (b) speech recognition score that is associated with the text sub-units of each matching area. Excerpts from the top-K best-matching concepts are extracted for content augmentation, and shown physically around the current segment, so that the presenter can easily refer to the best matching concepts without jumping back and forth in the presentation document, with a higher affinity to show concepts appearing earlier in the material that was covered more in-depth by the presenter.

Figure 1:
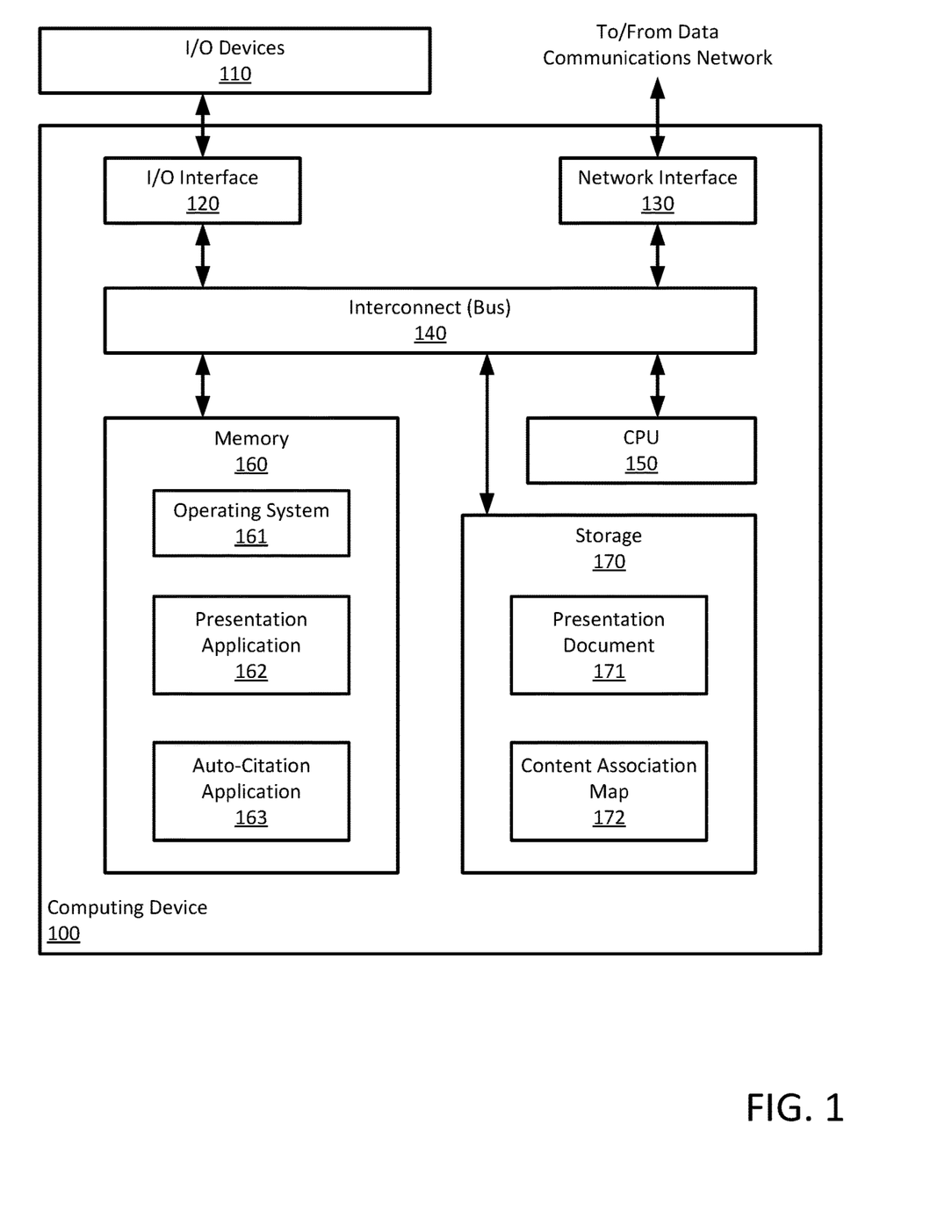
FIG. 1 illustrates a computing system, according to aspects of the preset disclosure.

FIG. 1 illustrates a computing system 100, which may be a personal computer, a laptop, a tablet, a smartphone, etc. As shown, the computing system 100 includes, without limitation, a central processing unit (CPU) 150, a network interface 130, an interconnect 140, a memory 160, and storage 170. The computing system 100 may also include an I/O device interface 120 connecting I/O devices 110 (e.g., keyboard, display and mouse devices) to the computing system 100.

The CPU 150 retrieves and executes programming instructions stored in the memory 160. Similarly, the CPU 150 stores and retrieves application data residing in the memory 160. The interconnect 140 facilitates transmission, such as of programming instructions and application data, between the CPU 150, I/O device interface 120, storage 170, network interface 140, and memory 160. CPU 150 is included to be representative of a single CPU, multiple CPUs, a single CPU having multiple processing cores, and the like. And the memory 160 is generally included to be representative of a random access memory. The storage 170 may be a disk drive storage device. Although shown as a single unit, the storage 170 may be a combination of fixed and/or removable storage devices, such as magnetic disk drives, flash drives, removable memory cards or optical storage, network attached storage (NAS), or a storage area-network (SAN). The storage 170 may include both local storage devices and remote storage devices accessible via the network interface 130.

Further, computing system 100 is included to be representative of a physical computing system as well as virtual machine instances hosted on a set of underlying physical computing systems. Further still, although shown as a single computing system, one of ordinary skill in the art will recognized that the components of the computing system 100 shown in FIG. 1 may be distributed across multiple computing systems connected by a data communications network.

As shown, the memory 160 includes an operating system 161 (e.g., Microsoft's WINDOWS® Operating System), a presentation application, and an auto-citation application 163. The presentation application and the auto-citation application 163 accesses one or more presentation documents 171 and associated content association maps (CAM) 172 that are maintained in the storage 170 to display the presentation document 171 and automatically generate citations to content within the presentation document 171 based on received natural language utterances made while the presentation document 171 is displayed in a Graphical User Interface (GUI).

Each presentation document 171 includes various content distributed across different zones of those presentation documents 171, and may be associated with CAM 172 that is produced according to an NLP extractive/abstractive technique. An associated CAM 172 identifies the key concepts discussed in a presentation document 171, and where the content embodying those key concepts are located throughout that presentation document 171. In various embodiments, a presentation document 171 includes various zones configured for individual display during a presentation (e.g., individual slides of a slideshow document, individual pages of a word processing document, individual sheets of a spreadsheet document), and each zone may be divided into various portions (e.g., text boxes, bullet points, rows/columns, paragraphs, sentences) that include different textual content that the CAM 172 associates with the various key concepts identified for the presentation document 171. In various embodiments, the CAM 172 is created before a presenter uses the associated presentation document 171 in a presentation as a one-off process, while in other embodiments, transcripts from prior presentations using the associated presentation document 171 are used to refine the CAM 172.

Figure 2:
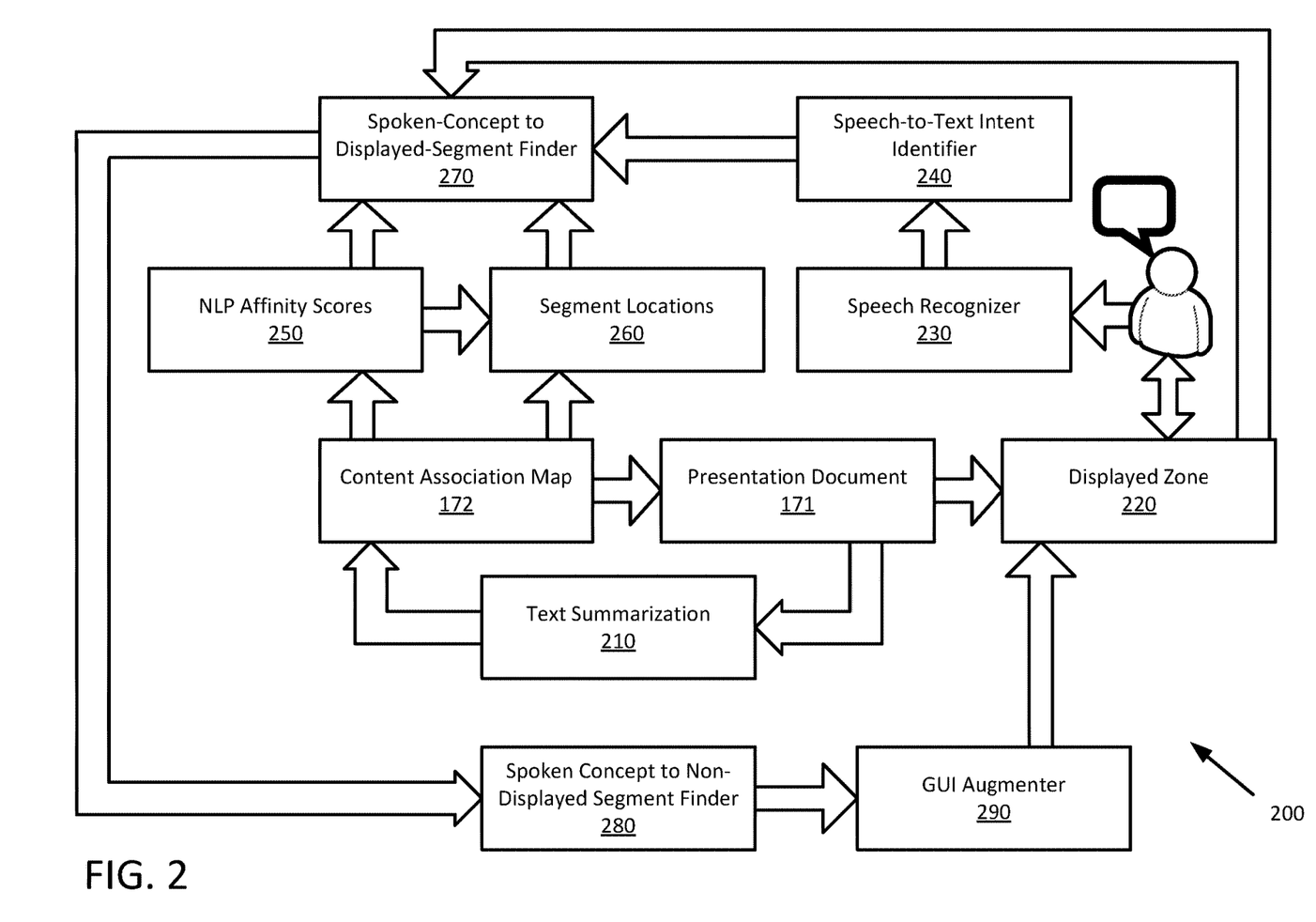
FIG. 2 illustrates a system architecture for deploying an auto-citation application during an oral presentation in conjunction with a presentation document, according to aspects of the present disclosure.

FIG. 2 illustrates a system architecture 200 for deploying an auto-citation application 163 during an oral presentation offered by a presenter with support from a presentation document 171. The various components and modules of the system architecture 200 may be provided by one computing system 100 connected to various peripherals (e.g., a personal computer connected to a projector device) or via networked computing systems 100 (e.g., a Web Presentation given on a first computing system 100 and displayed on a second computing system 100).

A text summarization module 210 applies an abstractive/abstractive NLP processing technique (e.g., concept clustering) to create the CAM 172 associated with the presentation document 171 to identify the concepts includes in the presentation document 171 and identify the segments of the presentation document 171 that are related to the various concepts identified. The text summarization module 210 processes the text included in the presentation document 171 as well as any meta-text associated with the segments, including, but not limited to: note fields, comment fields, an audio transcript from a previous oral presentation using the presentation document 171, captions/transcripts of audiovisual clips included in the presentation document 171, object names (e.g., Table 1, Image X), alt-text assigned to objects, uncommitted track-changes edits to the text, etc.

The CAM 172 provides NLP affinity scores 250 and segment locations 260 related to the different concepts identified therein. For example, a probabilistic affinity score 250 from 0 to 1 may be assigned to each segment in the presentation document 171 for each concept identified in the CAM 172 for the affinity/relevancy of that segment to the various concepts. The segment locations 260 cross reference different zones that the segments related to the same concept are located in. For example, a first segment in a first zone may be assigned an affinity score 250 of 0.7 for concept A and an affinity score 250 of 0.3 for concept B, while a second segment in the first zone is assigned an affinity score 250 of 0.0 for concept A and an affinity score of 0.9 for concept B. The segment locations 260 for the example first and second segments may link the first segment to segments in other zones of the presentation document 171 related to concepts A and B, and link the second segment to segments in other zones of the presentation document related to concept B (but not concept A).

The presentation application 162 displays a displayed zone 220 (i.e., the one zone of the presentation document 171 presently being displayed for presentation purposes) in a GUI, which the presenter may interact with to control the presentation (e.g., navigating slides, changing pages). As the presenter gives the presentation, a speech recognizer 230 receives the various utterances from the presenter (e.g., via a microphone) and identifies the words spoken by the presenter in the utterance (including pauses or silences as word-separators). In some embodiments, the speech recognizer 230 is further trained to identify different speakers and account for different patterns of speech, differences in pronunciation, pitch of voice, etc. The speech-to-text intent identifier 240 receives the words identified by the speech recognizer 230, and uses various NLP techniques, such as vectorization, to identify the underlying intent of the utterance. Because a presenter may state one intent using different linguistic structures, (e.g., "my dog is small" and "the small dog is mine" both convey an intent of the speaker's ownership of a small dog) or different intents using similar linguistic structures (e.g., "man bites dog" vs. "dog bites man"), the speech-to-text intent recognizer 230 is trained to recognize individual words as well as semantic relationships between words in a given utterance to identify the underlying intent of the utterance.

A spoken-concept to displayed segment finder 270 receives the determined intents from the speech-to-text intent identifier 240, receives NLP affinity scores 250 and segment locations 260 from the CAM 172, and receives an indication of which zone of the presentation document 171 is/was displayed by the presentation application 162 when the spoken utterance was made, to identify which segments in the displayed zone 220 that the speaker is referencing (if any) in a particular utterance. For example, with a displayed zone 220 that includes three segments, related to concepts A, B, and C respectively, a speaker may reference concepts A, B, C, and D in four separate utterances, which the speech-to-text intent identifier 240 identifies as being related to the first segment, the second segment, the third segment, and no segment of the displayed zone 220, respectively.

Figure 3:
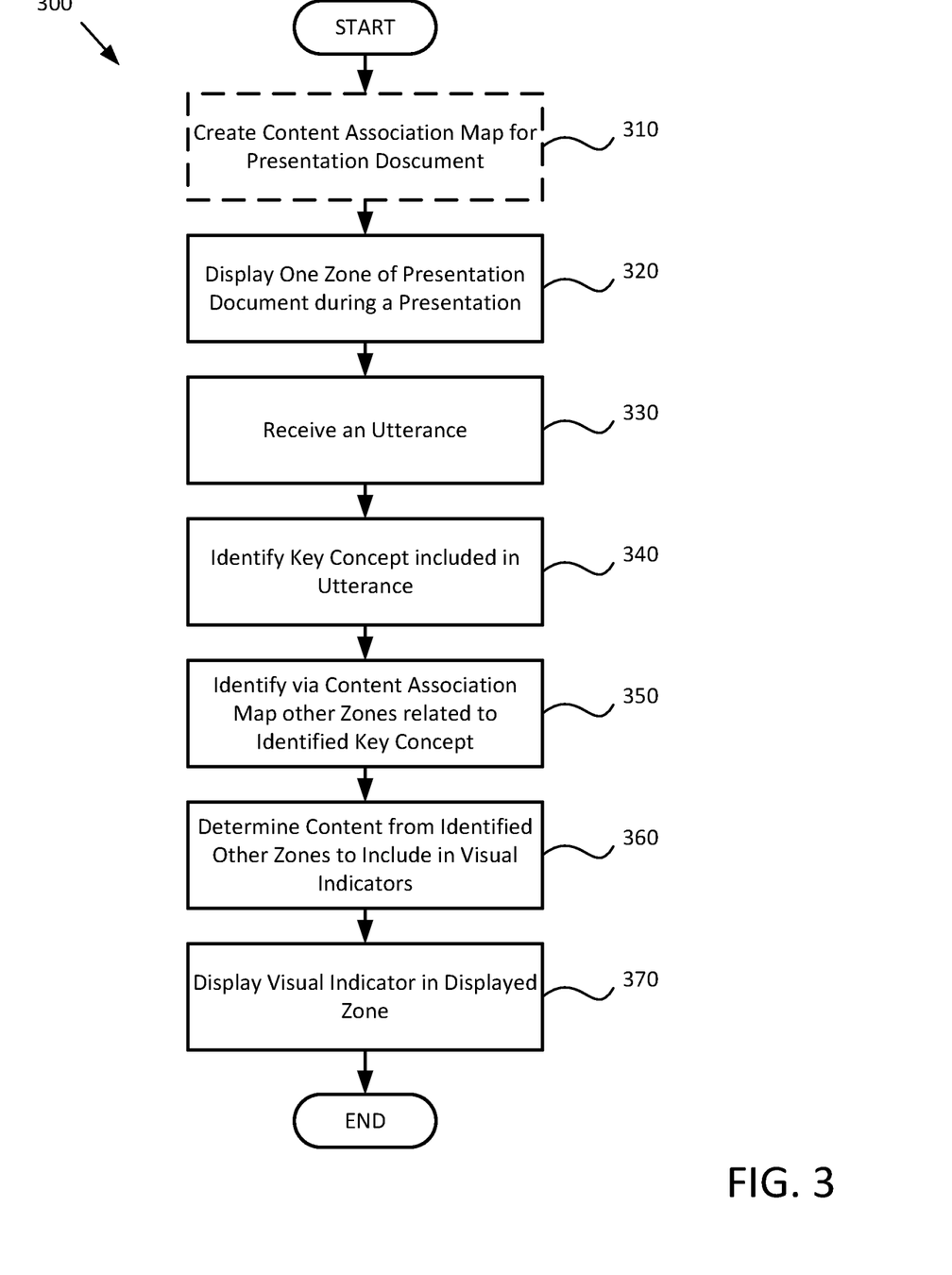
FIG. 3 is a flowchart of a method for auto-citing content from different portions of a presentation document in a displayed portion of the presentation document during a presentation session, according to aspects of the present disclosure.

FIG. 3 is a flowchart of a method 300 for auto-citing content from different portions of a presentation document 171 in a displayed portion of the presentation document 171 during a presentation session.

At block 310, an auto-citation application 163 creates a CAM 172 for an associated presentation document 171. The auto-citation application 163 summarizes the content of the presentation document 171 by one or more of an extractive or abstractive NLP technique to note the concepts covered by the presentation document 171, and where those concepts appear in the presentation document 171. The auto-citation application 163 may analyze the text and/or the meta-text of the document to create the CAM 172.

In some embodiments, block 310 is performed one time prior to a first presentation session using a particular presentation document 171 (or version thereof) and may be omitted in subsequent presentation sessions; reusing a CAM 172 across different presentation sessions. In other embodiments, block 310 is performed before every presentation session of a particular presentation document 171. Thus, method 300 may begin with block 310 or 320, depending on the settings a user sets for whether to create a new CAM 172 for each session, or reuse a previously generated CAM 172.

In method 300, blocks 320-370 are performed during the course of a presentation session, in which a user provides an utterance related to the content displayed in a particular portion of the presentation document 171. Although examples are given herein primarily in relation to the user being a presenter, in some embodiments, the user may be an audience member (e.g., asking a question) at the same location or a remote location from the presenter (e.g., via a web-presentation).

At block 320, one zone of the presentation document 171 is output for display during the presentation session. In various embodiments, the zone may be a slide of a slideshow document, a page (or visible portion thereof) of a word processing document, a sheet (or visible portion thereof) of a spreadsheet document, etc. The zone is displayed in a GUI of the presentation application 162, and the GUI may include various locations designated for various features of the presentation session. For example, a presenter and the audience members may be shown a view in a GUI of the content of the presentation document 171 that uses the entirety of a presentation device to display content (e.g., a full-screen presentation view). In another example, a presenter may be shown a view in a GUI having a various tools e.g., a presenter-specific view with annotation tools, timers, note sections) while an audience is provided with a GUI showing only the content. In a further example, an audience is provided with a GUI showing the content of the presentation document 171 in a subset of the available display space, with the remainder of the available display space used to provide interactivity tools (e.g., a question submission text box, annotation tools, a camera view of the presenter).

At block 330, the auto-citation application 163 receives an utterance from the user. In various embodiments, the auto-citation application 163 rejects utterances of less than a predetermined length of time or number of identified words. In some embodiments, the auto-citation application 163 identifies whether the utterance was received from a presenter or an audience member (or an audio/video clip included in and played back from the presentation document 171) to determine whether to accept/reject the utterance. For example, an auto-citation application 163 trained for a voice of the presenter may treat any audio received from the presenter as utterances, but reject any audio received from another source as a potential utterance. In another example, the auto-citation application 163 distinguishes utterances from audience members from utterances received from the presenter so that different notifications may be provided in the GUI.

At block 340, the auto-citation application 163 identifies the key concepts included in the received utterance. The auto-citation application 163 may convert the utterance to text and perform various speech recognition and intent recognition NLP processes on the utterance to determine the intent conveyed in the utterance.

At block 350, the auto-citation application 163, via the CAM 172 created in block 310, identifies other zones in the presentation document 171 than the displayed zone 220 that include content related to the key concepts identified in the utterance received at block 330 and analyzed per block 340. The auto-citation application 163 may identify various other zones and candidate segments of those zones that include content related to the intent of the utterance, and return up to the K best matches to the identified intent. In various embodiments, the auto-citation application 163 determines the K best segments having a highest affinity score for a particular intent (i.e., those segments determined to most likely to be related to the intent). In some embodiments, the auto-citation application 163 adjusts which segments are included in the K best by one or more of: whether the candidate segment appears earlier or later in the presentation document 171 than the displayed zone 220, whether the candidate segment appears in a preferred/forbidden zone of the presentation document 171, whether the candidate segment has been included in a previously presented visual indicator, a distance between the displayed zone 220 and the zone where the candidate segment appears in the presentation document 171, etc.

At block 360, the auto-citation application 163 determines what content from the identified other zones and candidate segments thereof are to be included in a visual indicator for display in the GUI in conjunction with the displayed zone 220. In various embodiments, based on the size of the visual indicators and the available display space in the GUI, the auto-citation application 163 determines to display more or less of the content from the other zones, or more of fewer visual indicators. The content included in the visual indicators include one or more of: a summary of the content from the other zone, a hyperlink to the other zone that the content is found in (e.g., a user interface object to navigate to the other zone), a thumbnail or other preview of the other zone that the content is found in, an indicator that the content was previously covered in detail, an indicator that the content will be covered in detail later in the presentation document 171, etc.

At block 370, the auto-citation application 163 displays the visual indicator in a designated location in the displayed zone 220 of the presentation document 171. In various embodiments, the designated location may be a particular section of the GUI (e.g., an citations section), or may be any portion of the GUI, which may include the content of the presentation document 171. In some embodiments, the visual indicator is displayed over some of the content of the presentation document 171; obscuring at least a portion of the presentation document from a user. In various embodiments, the visual indicator is selected and positioned such that the segment of the presentation document 171 setting forth the concept that the visual indicator is related to is not obscured; the visual indicator leaves the related segment in the displayed zone visible.

In one embodiment, a question in an utterance received from an audience member in a web presentation may result in the auto-citation application 163 presenting a visual indicator in an audience view of the GUI associated with that audience member, whereas other audience members do not receive the visual indicator. In another embodiment, an utterance received from the presenter results in a presenter-view GUI including the visual indicator, but an audience-view GUI not including a visual indicator. In another embodiment, any received utterance may result in the auto-citation application 163 presenting a visual indicator in the GUI. A user, as part of the setup of the auto-citation application 163 or presentation application 162, may select which utterances, from which persons result in visual indicators, and may select which views of the GUI those visual indicators are displayed to participants of the presentation session.

The user may also select how long a particular visual indicator remains displayed in the GUI. In various embodiments, visual indicators are displayed for a predetermined amount of time, until a user provides an utterance related to a different concept, until a user selects the visual indicator (e.g., navigating to a linked-to zone), the user navigates to a different zone of the presentation document, the screen real estate is requested by another visual indicator, etc.

Figure 4A:
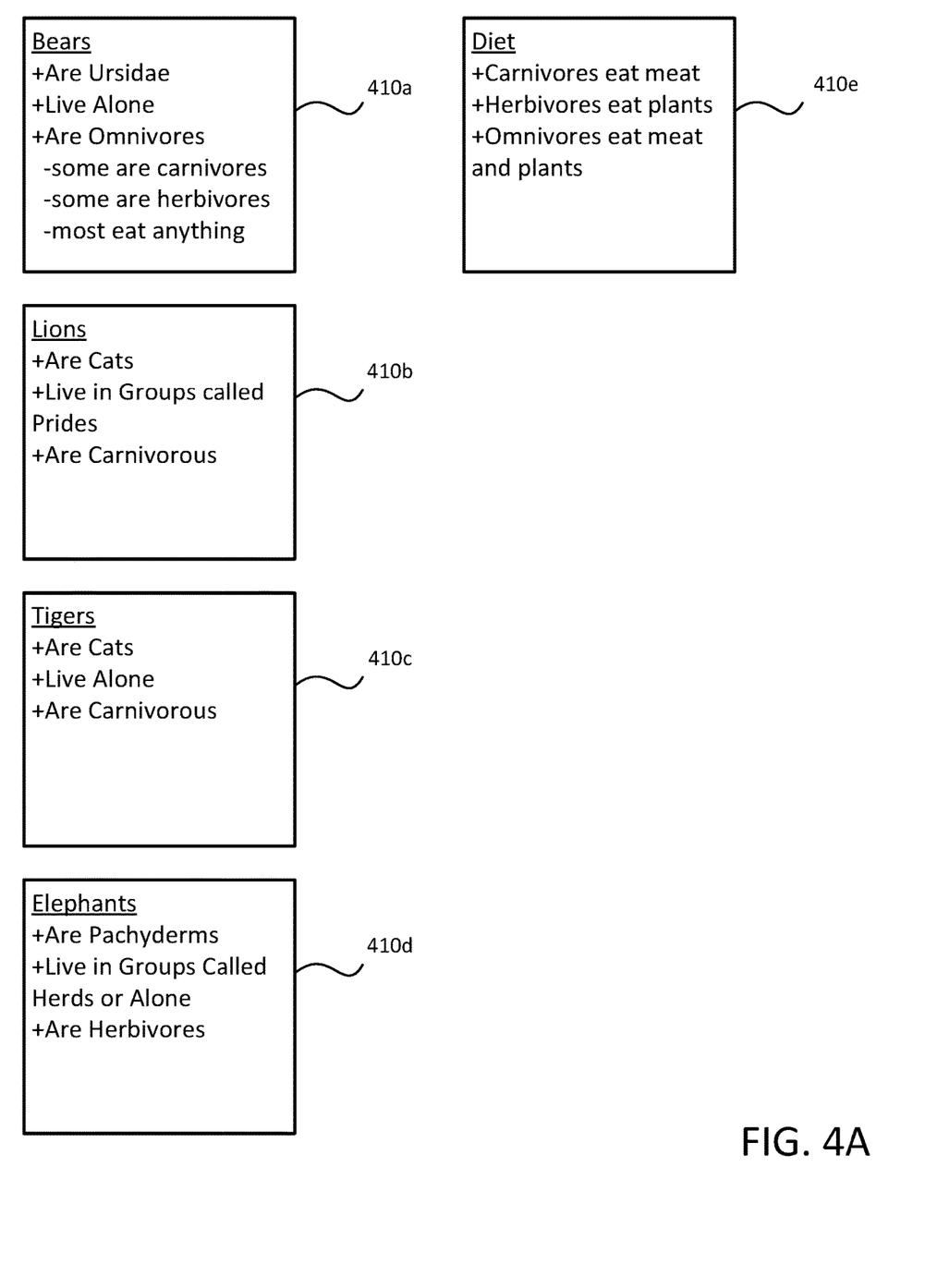
FIGS. 4A-4G illustrate a presentation sequence applying an auto-citation application, according to aspects of the present disclosure.

FIGS. 4A-G illustrate a presentation sequence applying an auto-citation application 172 as described herein. FIG. 4A illustrates a presentation document 171 of a slideshow, showing five zones 410a-e (generally, zones 410) represented as slides that are displayed individually during a presentation using the presentation document 171 that are referenced in FIGS. 4B-G. In other embodiments, a presentation document 171 may have more or fewer than five zones 410, which may be pages of a word processing document, sheets of a spreadsheet, annotated images of a photo album, etc.

Figure 4B:
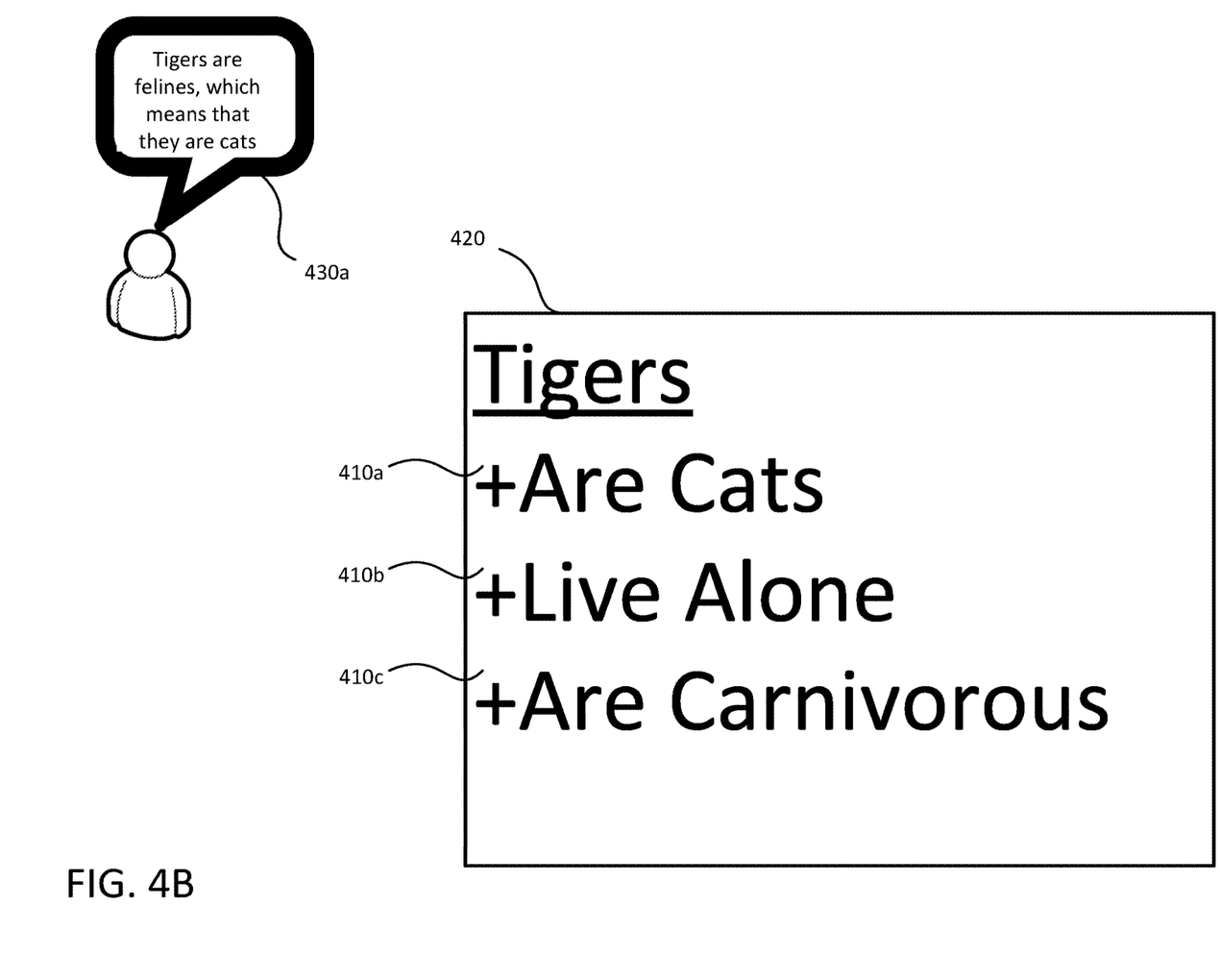

FIG. 4B illustrates a presenter using the presentation document 171 during a presentation, in which the third zone 410c is displayed in a GUI 420 while the presenter makes a first utterance 430a (generally, utterance 430) of "Tigers are felines, which means that they are cats." The GUI 420 displays the third zone 410c and the various segments 440a-c (generally, segments 440) of the third zone 410c. As illustrated, the segments 440 are speaking points in a bulleted list, but segments 440 may include other divisions of content in different embodiments, including paragraphs, sentences, tables (and rows/columns thereof), charts, text boxes, etc.

Figure 4C:
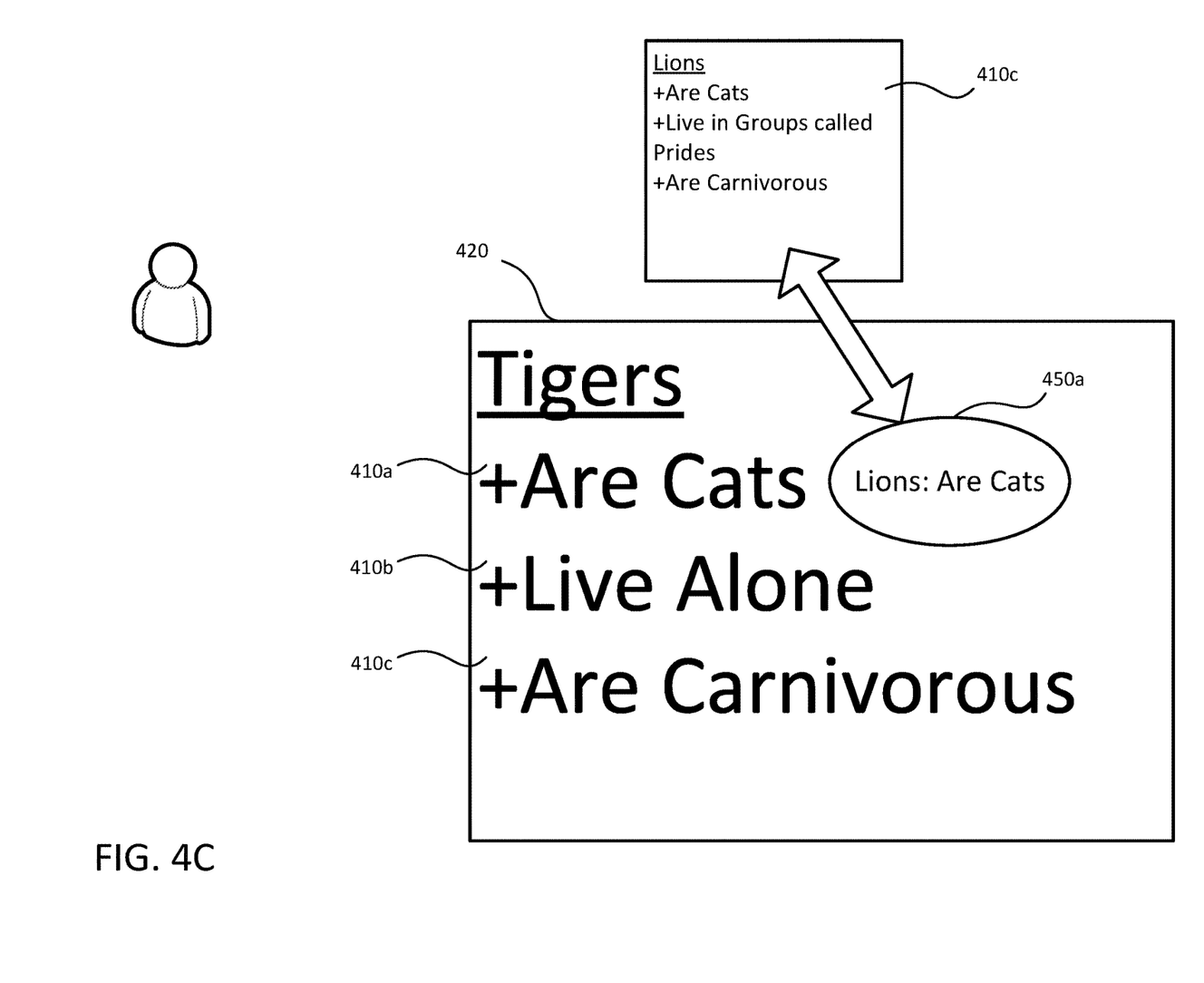

In response to receiving and processing the first utterance 430a, the auto-citation application 163 updates the GUI 420 from what is illustrated in FIG. 4B to what is illustrated in FIG. 4C. The auto-citation application 163 processes the first utterance 430a along with knowledge of the third zone 410c to determine that the content of first segments 440a is referenced by the first utterance 430a, and produces a visual indicator 450 related to the concept identified in the associated utterance 430 and linked to the content in another zone 410 of the presentation document 171. In the illustrated example, the first visual indicator 450 is related to the concept that tigers "are cats," per the first segment 440a and are linked to the similar concept that lions "are cats" indicated in the linked second zone 420b.

The visual indicator 450 provides a citation in the GUI 420 to content not otherwise displayed in the GUI 420 (i.e., on other zones 410 not currently displayed by the GUI 420). In various embodiments, the visual indicator 450 is positioned in the GUI 420 to appear in a designated area of the GUI 420 so that the segment 440 related to the visual indicator 450 (e.g., in FIGS. 4B and 4C, the first segment 440a) remains visible in the GUI 420. In some embodiments, the visual indicator 450 includes a hyperlink or other control selectable by the presenter to navigate to the other zone 410 linked to. In some embodiments, the visual indicator 450 includes a summary of the content from the other zone 410 linked to. The visual indicator 450 may remain displayed in the GUI 420 until interacted with by the presenter, the zone 410 in the GUI 420 is updated, a predefined amount of time has passed, or another utterance 430 is received that involves a different concept.

Figure 4D:
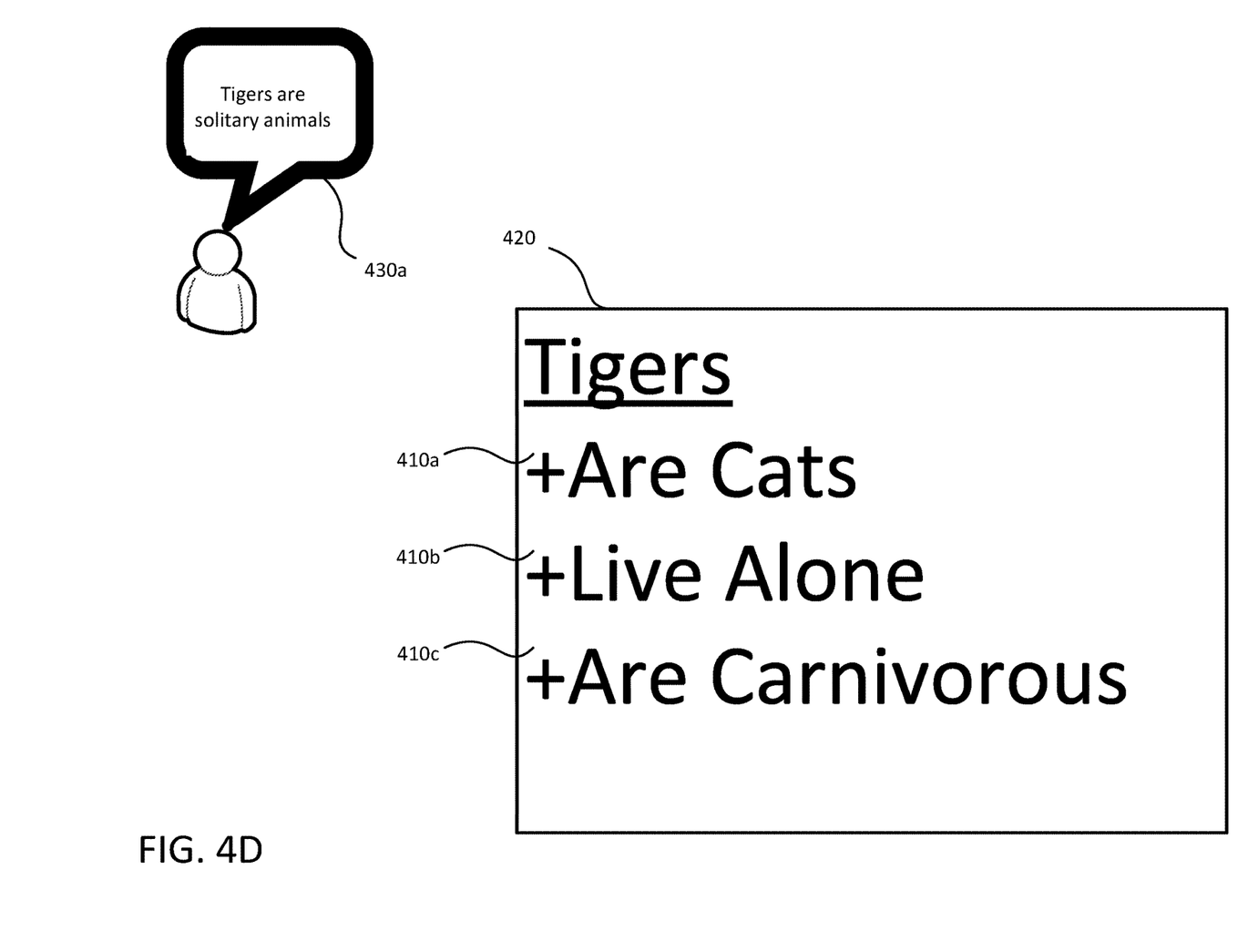
Figure 4E:
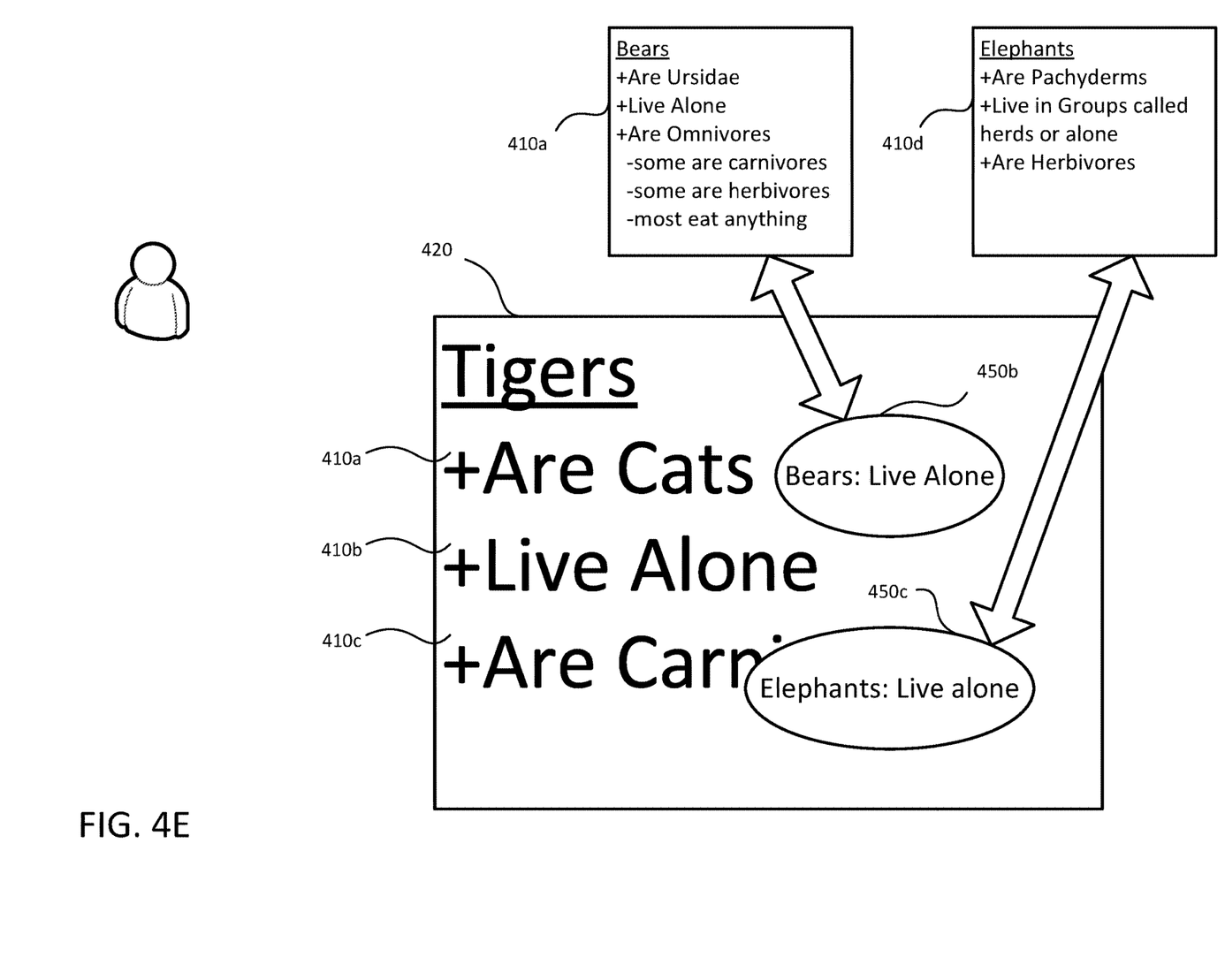

FIG. 4D illustrates the presenter continuing the presentation when the presenter makes a second utterance 430b of "Tigers are solitary animals." In response to receiving and processing the second utterance 430b, the auto-citation application 163 updates the GUI 420 from what is illustrated in FIG. 4D to what is illustrated in FIG. 4E.

FIG. 4E illustrates the GUI 420 updated to include a second visual indicator 450b linked to content on the first zone 410a and a third visual indicator 450c linked to content on the fourth zone 410d related to the concept of a given animal "not living in a group." Although second utterance 430b included the term "solitary" rather than "alone" or "not in a group," the auto-citation application 172 is able to identify the intent of the second utterance 430b matches the concepts included in the presentation document 171 despite using different terminology. The auto-citation application 163 is able to identify areas in the GUI 420 of the currently displayed zone 410 to position the visual indicators 450 that keep the segment 440 visible to the audience and/or the presenter, and places the visual indicator(s) 450 in those positions.

As illustrated, the auto-citation application 172 has identified two other zones 410 including content related to the second utterance 430b. In various embodiments, the auto-citation application 163 identifies the K best matches to the intent of a received utterance 430 and determines what subset of the K best matches to display based on one or more of a relevancy threshold, available space in the GUI 420 and size of the visual indicators 450, or an order in the presentation document 171 in which the other content is found. For example, if the auto-citation application 163 identifies the ten best matches of content in other zones 410 to the intent (i.e., when K=10), but eight of those matches have affinity scores below a relevancy threshold, the auto-citation application 163 may only supply the two best matches of the K best matches that satisfy the relevancy threshold. In another example, if the auto-citation application 163 identifies the ten best matches of content in other zones 410 to the intent (i.e., when K=10), but determines that the areas designated for displaying the visual indicators 450 is large enough to display two or fewer visual indicators 450, the auto-citation application 163 may adjust based on the available space in the GUI 420 (e.g., from K=10 to K=2) or select a subset of other content from the best matches based on other criteria (e.g., presentation order, distance in presentation document 171 from currently displayed zone 410, frequency of selection).

Figure 4F:
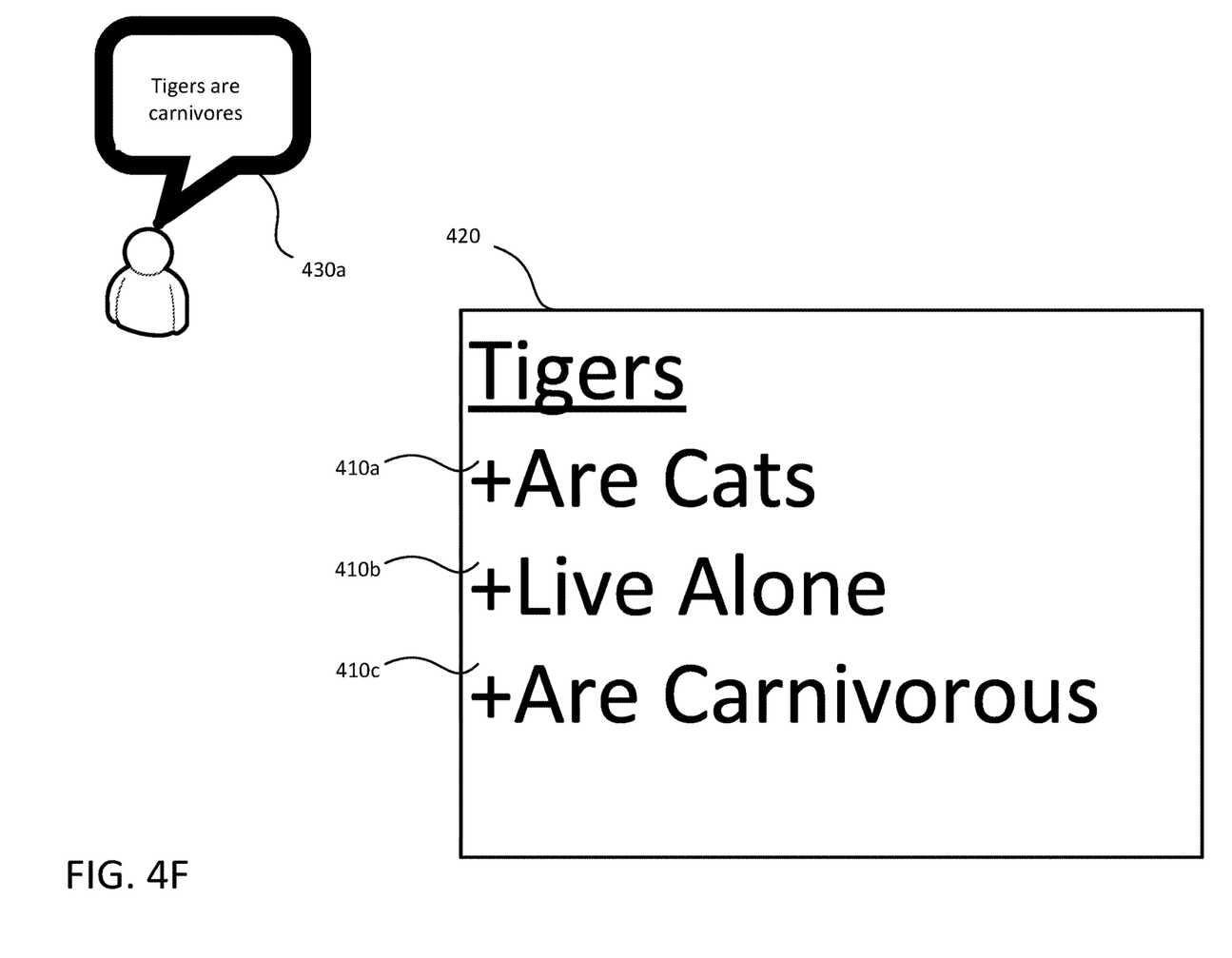
Figure 4G:
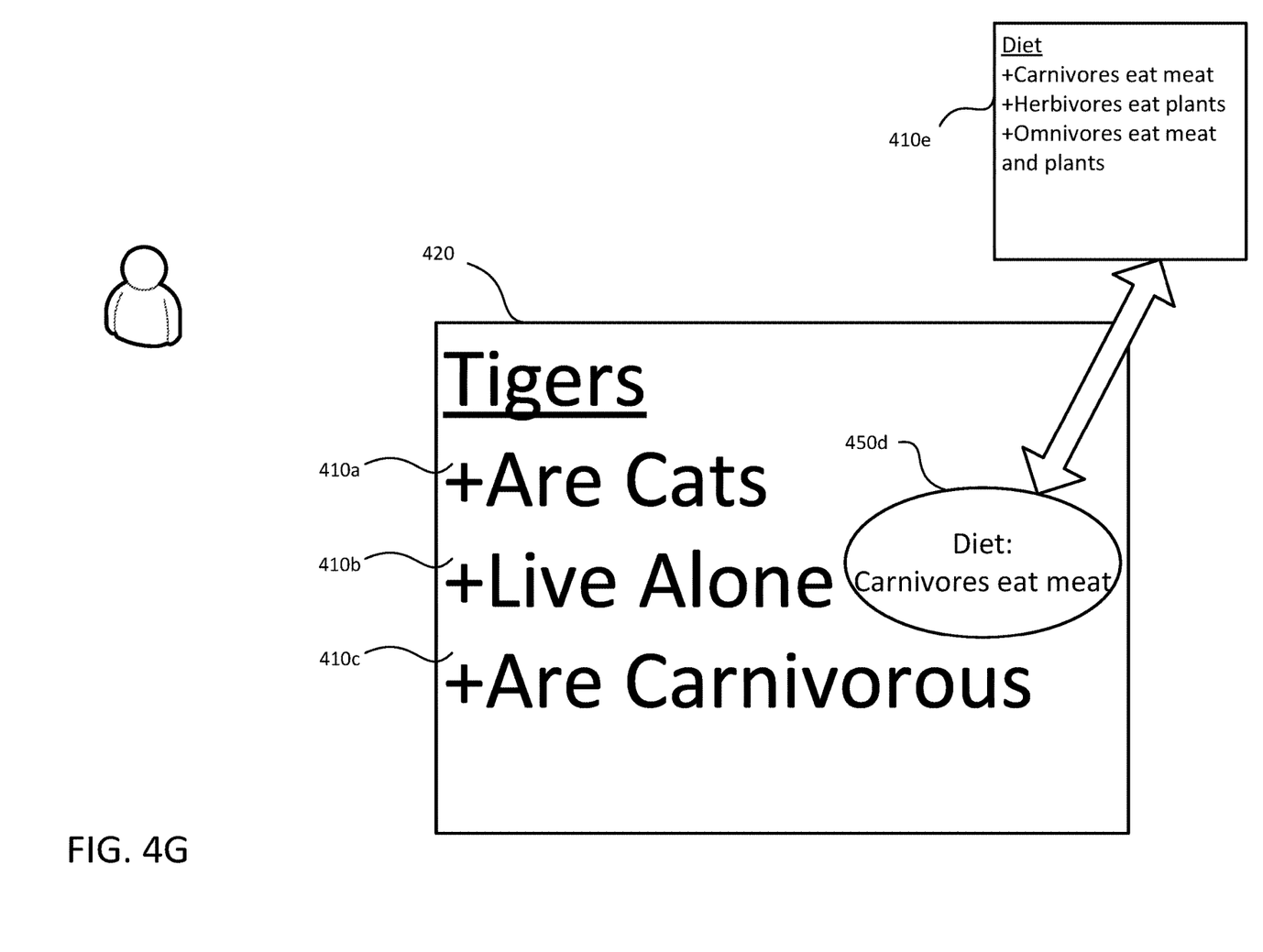

FIG. 4F illustrates the presenter continuing the presentation when the presenter makes a third utterance 430c of "Tigers carnivores." In response to receiving and processing the third utterance 430c, the auto-citation application 163 updates the GUI 420 from what is illustrated in FIG. 4F to what is illustrated in FIG. 4G.

FIG. 4G illustrates the GUI 420 updated to include a fourth visual indicator 420d linked to content on the fifth zone 410e related to the concept of what "carnivores" are. Although the concept or a definition for what a carnivore appears in other zones 410 in addition to the fifth zone 410e, the auto-citation application 163 may select the best matches based on criteria in addition to or instead of an affinity score, such a relative position in the presentation document 171 so that content appearing before/after, further from/closer to the currently displayed zone 410 is more likely to be presented in a visual indicator 450 based on user preferences. In another example, content that has previously been presented in a visual indicator 450 is more or less likely to appear in a future visual indicator 450. In a further example, the auto-citation application 163 is directed to avoid linking to certain zones 410 of the presentation document 171 (e.g., a title page, table of contents, bibliography) or to prioritize linking to certain zones 410 (e.g., a definitions section, bibliography, notes section).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
displaying, simultaneously in a presentation view of a graphical user interface (GUI) on a first device and an audience view of the GUI on a second device, a given zone of a plurality of zones included in a presentation document, wherein the GUI displays a single zone of the plurality of zones in the presentation document at a given time and navigates to different zones of the plurality of zones only via commands received from the first device;
identifying, in an utterance received from a given audience member not in control of the presentation view of the GUI while the given zone is displayed in the GUI, a given key concept;
identifying, via a content association map associated with the presentation document that identifies key concepts recited in the presentation document and which zones of the plurality of zones the key concepts appear in, a different zone of the plurality of zones that is not currently displayed in the GUI but in which the given key concept appears;
selecting a content item from the different zone related to the given key concept; and
displaying, in the audience view of the given zone on the second device and not in the presentation view of the given zone on the second device, a visual indicator related to the different zone that includes the content item.

2. The method of claim 1, further comprising:
determining a location in the GUI at which a segment of the given zone referencing the given key concept included in the utterance is displayed; and
positioning the visual indicator of the different zone in a different location of the GUI than where the segment is displayed such that the visual indicator leaves the segment visible.

3. The method of claim 1, further comprising:
identifying an additional zone of the plurality of zones that the given key concept appears in;
in response to determining an available screen real estate of the GUI is insufficient to display the visual indicator of the different zone and an additional visual indicator of the additional zone, prioritizing the visual indicator of the different zone for display over the additional visual indicator of the additional zone based on the different zone preceding the additional zone in an order of the plurality of zones.

4. The method of claim 1,
wherein:
the the given audience member is one of a plurality of audience members, and
presenting the visual indicator in the audience view of the GUI includes presenting the visual indicator on the second device associated with the given audience member and not presenting the visual indicator in audience views of the GUI on a third device associated with a different audience member of the plurality of audience members.

5. The method of claim 1, further comprising removing the visual indicator from the audience view of the GUI in response to at least one of:

receiving a command from a presenter, who is in control of the first device, to display another zone of the plurality of zones in the GUI to replace display of the given zone;

receiving a second utterance from the given audience member that includes a different key concept from the given key concept; and receiving a command from the given audience member to dismiss the visual indicator.

6. The method of claim 1, wherein the visual indicator identifies that the content item was covered at an earlier time in a presentation of the presentation document.

7. The method of claim 1, wherein the given key concept is not displayed in the given zone.

8. The method of claim 1, wherein the presentation view is different from the audience view.

9. A system, comprising:
a processor; and
a memory storage device, including instructions that when executed by the processor enable the processor to perform an operation, the operation comprising:
displaying, simultaneously in a presentation view of a graphical user interface (GUI) on a first device and an audience view of the GUI on a second device, a given zone of a plurality of zones included in a presentation document, wherein the GUI displays a single zone of the plurality of zones in the presentation document at a given time and navigates to different zones of the plurality of zones only via commands received from the first device;
identifying, in an utterance received from a given audience member not in control of the presentation view of the GUI while the given zone is displayed in the GUI, a given key concept;
identifying, via a content association map associated with the presentation document that identifies key concepts recited in the presentation document and which zones of the plurality of zones the key concepts appear in, a different zone of the plurality of zones that is not currently displayed in the GUI but in which the given key concept appears;
selecting a content item from the different zone related to the given key concept; and
displaying, in the audience view of the given zone on the second device and not in the presentation view of the given zone on the second device, a visual indicator related to the different zone that includes the content item.

10. The system of claim 9, the operation further comprising:
determining a location in the GUI at which a segment of the given zone referencing the given key concept included in the utterance is displayed; and
positioning the visual indicator of the different zone in a different location of the GUI than where the segment is displayed such that the visual indicator leaves the segment visible.

11. The system of claim 9, the operation further comprising:
identifying a third zone of the plurality of zones that the given key concept appears in;
in response to determining an available screen real estate of the GUI is insufficient to display the visual indicator of the different zone and an additional visual indicator of the third zone, prioritizing the visual indicator of the different zone for display over the additional visual indicator of the third zone based on the different zone preceding the third zone in an order of the plurality of zones.

12. The system of claim 9, wherein the content association map is created via natural language processing extraction of the presentation document to identify the key concepts included in the presentation document and identify which key concepts are referenced in particular portions of particular zones.

13. The system of claim 9, wherein the plurality of zones are slides when the presentation document is a slideshow document, pages when the presentation document is a word processing document, and worksheets when the presentation document is a spreadsheet document.

14. The system of claim 9, wherein the operation further comprises removing the visual indicator from the audience view of the GUI in response to at least one of:
receiving a command from a presenter, who is in control of the first device, to display another zone of the plurality of zones in the GUI to replace display of the given zone;
receiving a second utterance from the given audience member that includes a different key concept from the given key concept; and
receiving a command from the given audience member to dismiss the visual indicator.

15. A computer program product, the computer program product comprising:
a computer-readable storage medium having computer-readable program code embodied therewith, the computer-readable program code executable by one or more computer processors to:
display, simultaneously in a presentation view of a graphical user interface (GUI) on a first device and an audience view of the GUI on a second device, a given zone of a plurality of zones included in a presentation document, wherein the GUI displays a single zone of the plurality of zones in the presentation document at a given time and navigates to different zones of the plurality of zones only via commands received from the first device;
identify, in an utterance received from a given audience member not in control of the presentation view of the GUI while the given zone is displayed in the GUI, a given key concept;
identify, via a content association map associated with the presentation document that identifies key concepts recited in the presentation document and which zones of the plurality of zones the key concepts appear in, a different zone of the plurality of zones that is not currently displayed in the GUI but in which the given key concept appears;
select a content item from the different zone related to the given key concept; and
display, in the audience view of the given zone on the second device and not in the presentation view of the given zone on the second device, a visual indicator related to the different zone that includes the content item.

16. The computer program product of claim 15, wherein the computer-readable program code is further executable by one or more computer processors to:
determine a location in the GUI at which a segment of the given zone referencing the given key concept included in the utterance is displayed; and position the visual indicator of the different zone in a different location of the GUI than where the segment is displayed such that the visual indicator leaves the segment visible.

17. The computer program product of claim 15, wherein the computer-readable program code is further executable by one or more computer processors to:
   identify a third zone of the plurality of zones that the given key concept appears in;
      in response to determining an available screen real estate of the GUI is insufficient to display the visual indicator of the differently zone and an additional visual indicator of the third zone, prioritize the visual indicator of the different zone for display over the additional visual indicator of the third zone based on the different zone preceding the third zone in an order of the plurality of zones.

18. The computer program product of claim 15, wherein the content association map is created via natural language processing extraction of the presentation document to identify the key concepts included in the presentation document and identify which key concepts are referenced in particular portions of particular zones.

19. The computer program product of claim 15, wherein the computer-readable program code is further executable by one or more computer processors to:
   in response to receiving a selection of a hyperlink included in the visual indicator, replacing display of the given zone with display of the different zone in the GUI.

20. The computer program product of claim 15, wherein the computer-readable program code is further executable by one or more computer processors to remove the visual indicator from the audience view of the GUI in response to at least one of:
   receiving a command from a presenter, who is in control of the first device, to display another zone of the plurality of zones in the GUI to replace display of the given zone;
   receiving a second utterance from the given audience member that includes a different key concept from the given key concept; and
   receiving a command from the given audience member to dismiss the visual indicator.

\* \* \* \* \*